United States Patent [19]
Leibowitz et al.

[11] 4,023,019
[45] May 10, 1977

[54] AUTOMATIC SCALED DIGITAL INTEGRATOR

[75] Inventors: Lawrence M. Leibowitz, Fairfax, Va.; Phillip L. Watkins, Rockville, Md.

[73] Assignee: The United States of America as represented by the Secretary of the Navy, Washington, D.C.

[22] Filed: Sept. 23, 1974

[21] Appl. No.: 508,786

[52] U.S. Cl. .......................... 235/150.51; 235/183; 324/130
[51] Int. Cl.² ...................... G06F 7/38; G06G 7/18
[58] Field of Search ............ 235/150.51, 151, 183, 235/151.3, 92 NT, 92 EA; 324/130, 115; 328/127

[56] References Cited

UNITED STATES PATENTS

| | | | |
|---|---|---|---|
| 3,422,435 | 1/1969 | Cragon et al. | 235/150.51 X |
| 3,479,592 | 11/1969 | Nardontonia | 324/130 X |
| 3,653,015 | 3/1972 | Rock | 235/92 EA X |
| 3,783,392 | 1/1974 | Drake et al. | 328/127 |
| 3,796,952 | 3/1974 | Bayer | 324/130 |
| 3,851,160 | 11/1974 | Heimprecht | 235/151.3 |

*Primary Examiner*—Jerry Smith
*Attorney, Agent, or Firm*—R. S. Sciascia; Philip Schneider; Norman Brown

[57] ABSTRACT

A digital scaler adjusts the processing of an input signal to a digital feedback integrator by a multiplying technique which is implemented by shifting the connections between an analog-to-digital converter and the input to an adder, both forming the input section of a digital feedback integrator, in order to maintain a constant dynamic range of the output signal.

5 Claims, 2 Drawing Figures

AUTOMATIC SCALED DIGITAL INTEGRATOR

BACKGROUND OF THE INVENTION

The present invention relates to digital integrators, and more particularly to the automatic scaling of input samples to a digital feedback integrator in accordance with a change in the number of samples to be integrated.

Digital integrators of the feedback type are widely utilized in many fields of electronics to implement an integrating function and more specifically, to implement a single-pole digital filter. They are especially useful in the area of signal processing for integrating or auto-correlating several signal returns in order to enhance a signal relative to a noise background. In this regard, it is often desirable to change the number of samples integrated. For example, in one instance it may be desirable to integrate 1024 samples while in another instance 8 might be more appropriate.

A feedback integrator operates by adding to the input signal a weighted value of past integrator output. The sum becomes the new integrator output and is stored in the integrator's register. In this process, the weighting factor in effect determines the integrator's memory time, or period of integration.

Unfortunately, utilization of digital integrators has not been without its problems. One that has been particularly bothersome is the effect on an analog display which displays the result of the digital integration. The display operates satisfactorily when the feedback integrator is integrating the largest number of samples which the integrator is designed to process. When the integrator is processing the maximum number of maximum amplitude signals, then after all the samples have been processed, the integrator's register is filled to its capacity, representing a maximum magnitude integration result. A digital-to-analog converter then translates the number stored in the register into a full screen deflection voltage.

But when the sample size selected for integration is smaller then the maximum designed size, a problem of reduced output dynamic range occurs — a problem which becomes progressively worse as the number of samples selected for integration become smaller.

The dynamic range problem arises in that the register, designed to accumulate a maximum number of samples, remains fairly empty when only a small number of samples are integrated. For example, a feedback integrator may be designed to process 1024 samples of a signal quantized into 16 levels (representing zero through fifteen). The sixteen levels may be represented mathematically and electrically by four binary digits, or bits. If each of the 1024 samples was of its maximum value of 15, then a register to store them all would need storage space equivalent to the representation of the quantity 1024 × 15, or 15,360. This could be stored in a register containing 14 binary bits (providing a maximum representation of 16,384).

Now, if the operation of the feedback integrator were changing so as to integrate only 8 samples, the register would fill to a much lesser extent. For example, 8 maximum-level signals would occupy the binary equivalent of only 8 × 15 = 120. This can be represented and stored in a binary register containing only 7 binary bits.

Regarding digital processing devices of this nature, the most significant digit stored in the binary register is generally found in the left-most position. Conversely, the least significant digit is then generally to be found in the right-most register position.

The digital-to-analog device which converts the binary number stored in the register to an analog display signal attributes half of the total maximum display signal magnitude to the most significant position (binary digit) and half of the remaining magnitude to the remaining bits. In this manner, the display converter assigns less and less weight to digits located respectively in the less significant register bit positions. Because of this, the magnitude of the signal to the display system is primarily derived from the most significant register bit positions.

While an integration of 1024 maximum-valued samples might, for example, be converted to read 15 volts for a full scale display reading, an integration of only eight full scale samples would yield only 120/15360 or 0.013 of the full scale of 15 volts, resulting in a voltage of 0.198 volts. Clearly this value is very much less than the 15 volt signal needed for full scale deflection of the display.

As the number of samples to be integrated is reduced, the full scale output voltage to the display is reduced in like proportion. In order to compensate for the lowered output voltage associated with the reduction in number of samples so that full scale deflection is maintained, prior techniques have gone in two major directions. The first method is easily implemented and inexpensive. It is to simply increase the sensitivity of the display system so that the much lower analog display voltage will cause a full scale deflection of the display. Unfortunately this causes an undesirable condition in which noise-signals in the system become quite evident in the display presentation (due to the additional amplification). These displayed noise signals can interfere with detection of a true signal by masking it.

The second method is moderately effective but expensive. Switch connections are implemented between the shift-register (storing the result of the integration) and the output digital-to-analog converter. The switching is arranged so that the most-significant-bit position of the converter is connected to the shift-register position containing the most-significant-bit that results from the integration of the smaller sample size. For a typical digital-to-analog display signal converter having 20 binary-bit input positions, an ability to typically switch 20 positions among several shift-register output terminals is required. Switching of this nature tends to be costly and unreliable.

The present invention accomplishes scaling of the samples to be integrated so that an input signal having a maximum value will result in a maximum value of display voltage from the digital-to-analog converter, independent of the number of samples selected for integration.

SUMMARY OF THE INVENTION

The present invention scales, by a factor related to the number of samples to be integrated, each input signal being integrated in avariable-sample-size digital integrator.

Scaling is accomplished by a digital multiplier located between an input analog-to-digital converter and the digital integrating portion of the integrator. The magnitude of the signal, or sample, applied to the integrator is scaled so as to maintain maximum accumulation of data into the most significant bit positions of the integration-accumulator, or register. A digital-to-analog converter connected to the integration-register will thereby receive data from the most significant register positions. By this technique the dynamic range of the display voltage corresponding to the integrator's output will remain constant, independent of the number of samples chosen to be integrated.

It is therefore an object of the present invention to adjust the magnitude of signals to be integrated by a digital integrator.

It is another object of the present invention to adjust, in accordance with the number of samples to be integrated, the magnitude of a signal to be integrated by a digital integrator.

It is a further object of the present invention to maintain as constant the display range of a result of a particular digital integration, independent of the number of samples integrated, without altering or switching the connections associated with the output of the integrator-register.

DETAILED DESCRIPTION OF THE INVENTION

Figure 1:
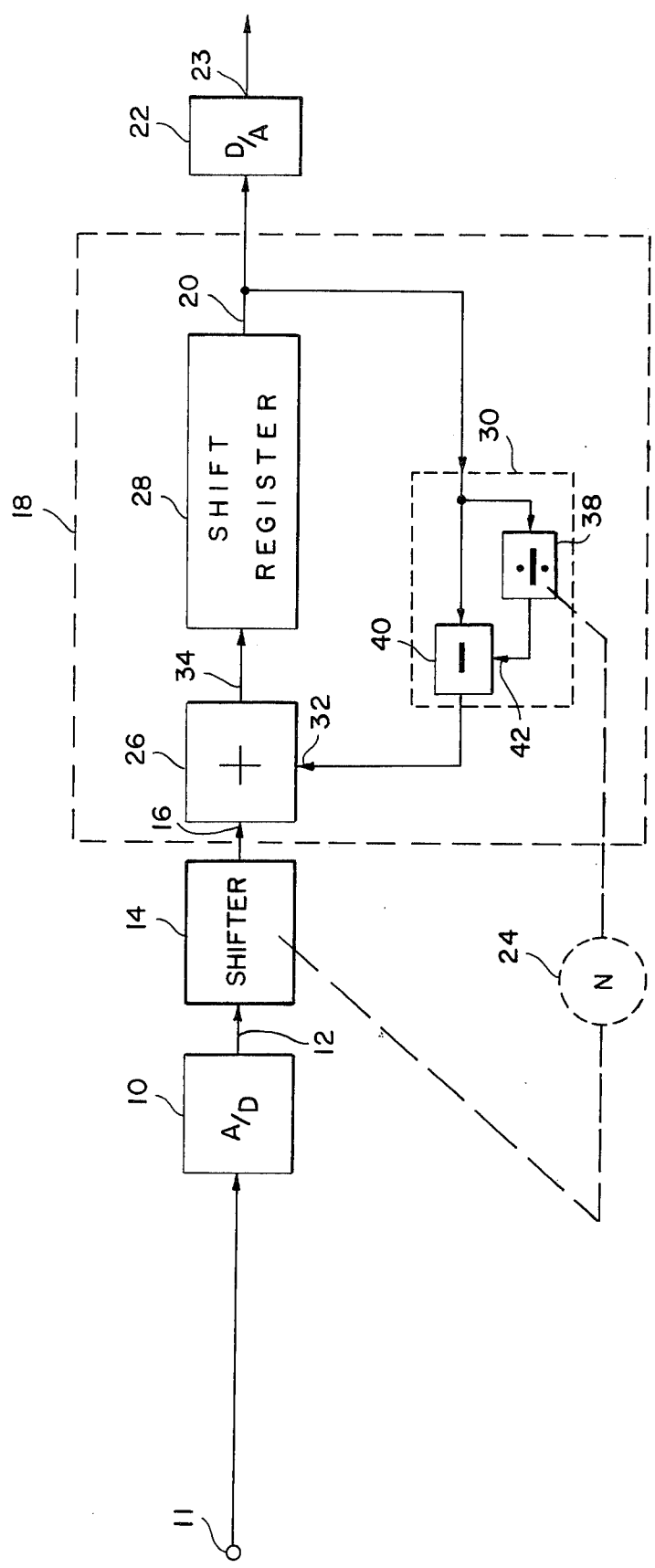
FIG. 1 is a functional block diagram of a digital integrator embodying the present invention.

Referring now to FIG. 1, a signal conditioning means for converting an analog input signal to a parallel digital signal for integration, such as analog-to-digital (A/D) converter, 10, has an input terminal 11. A/D converter 10 has output terminals 12 connected to input terminals of a digital scaler, or shifter 14. Each group of plural input or output terminals of each functional device forms a set of parallel digital lines.

Digital scaler 14 has output terminals connected to a set of input terminals 16 of a conventional feedback integrator 18. Feedback integrator 18 has output terminals 20 connected to input terminals of a digital-to-analog (D/A) converter 22. D/A converter 22 has an output terminal 23 to which an analog display device may be connected.

A main selector switch 24 is mechanically coupled to both shifter 14 and feedback integrator 18.

Feedback integrator 18 is comprised of an adder 26, a shift register 28, and a feedback-multiplier device 30. Adder 26 has first input terminals 16, second input terminals 32 and output terminals 34. Adder output terminals 34 are connected to input terminals of shift register 28.

Shift register 28 has output terminals 20 which are connected through feedback-multiplier device 30 to second adder input terminals 32.

Feedback-multiplier device 30 is comprised of a binary divider 38 and a digital subtractor 40, each having input terminals connected to register output terminals 20.

Divider 38 has its output terminal connected to a second group of input terminals 42 of subtractor 40. Divider 38 is formed by a set of ganged switches mechanically coupled to the main selector switch 24 and arranged to perform binary division (by shifting lines). Position settings of the ganged switches form the other divider input. Subtractor 40 has its output terminals connected to second adder input terminal 32.

Utilization of the scaling device 14 between the signal conditioning means and the feedback integrator is at the heart of the present invention.

Figure 2:
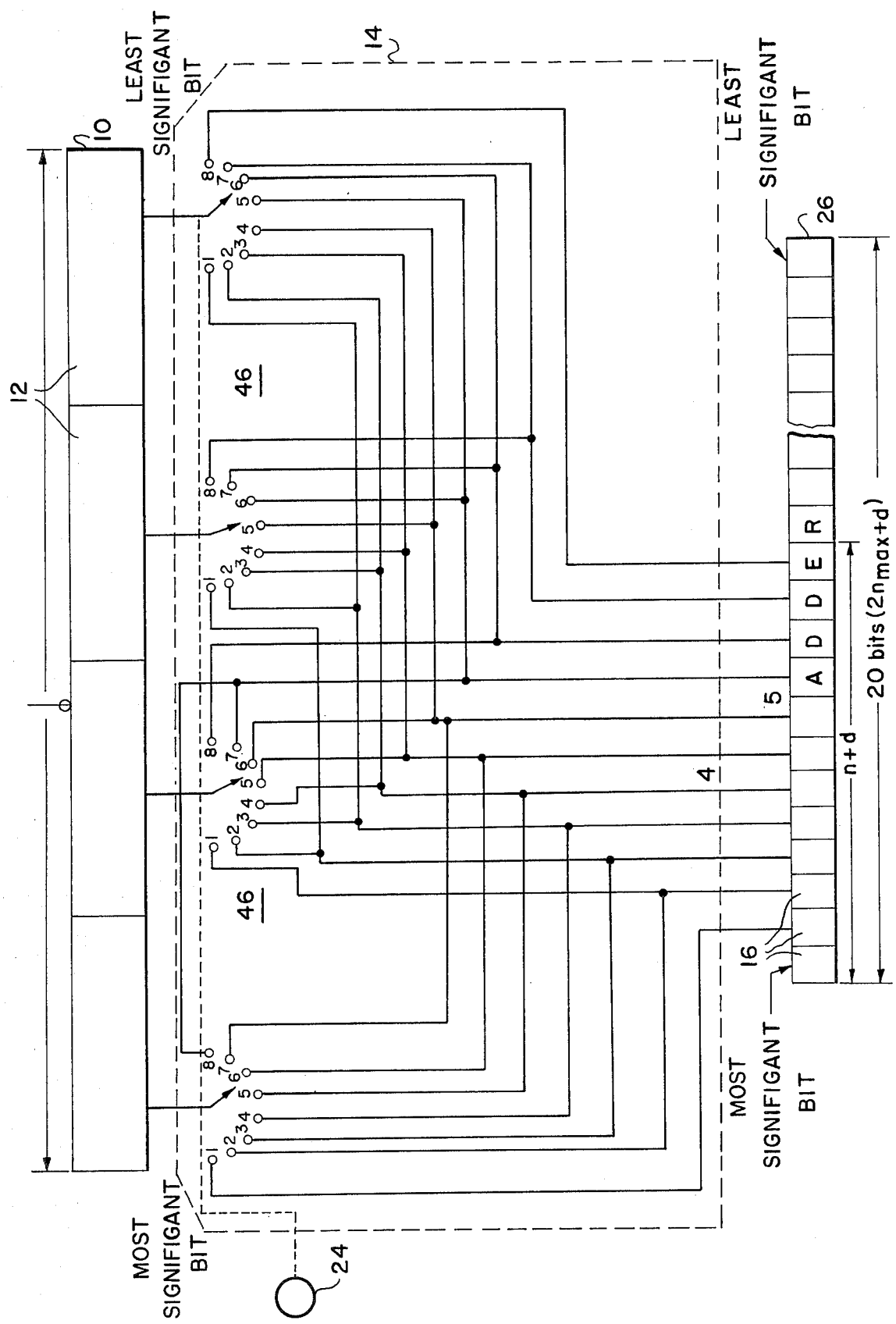
FIG. 2 is a wiring diagram showing one embodiment of the scaling multiplier of the present invention.

FIG. 2 shows a digital scaler 14 connected between A/D converter output terminals 12 and the adder input terminals 16. The number of adder input terminals 16 is $2n_{max} + d$, where $n_{max}$ is the binary exponent of the maximum number of signals to be integrated while $d$ is the number of A/D converter output lines. In the embodiment of the present invention $n_{max}$ is chosen to be 8, while $d$ is chosen to be 4.

Each A/D converter digital output line 12 is connected to the center pole of a corresponding multiple position switch 46 of shifter 14. Each shifter switch 46 is a single pole, 8 position type having its center pole mechanically coupled to main selector switch 24. Switch positions of switches 46 are connected to corresponding digital lines within the group of $n_{max} + d$ leftmost digital lines 16 of adder 26.

If the pole, of a particular switch (located with respect to the A/D converter output lines 12) of shifter switches 46 is denoted as $p$ (with $p$ increasing from $l$ to $d$ as location of the switches progress from left to right), and if the switch setting position is denoted as $s$ (with $s$ increasing from $l$ to $n$), then the $s^{th}$ switch position of the $p^{th}$ switch will be connected to the $(s+p+n_{min}-1)$ adder input terminal 16. The value of $n_{min}$ is equal to the binary exponent of the minimum number of samples that the integrator is designed to process. For example, the fourth switch setting position of the third switch (using $n_{min} = 1$) is connected to the $7^{th}$ digital line of adder input terminals 16 (with the first line being the most significant (leftmost) digital line).

It should be noted that the mechanical switches utilized in the embodiment of the present invention could be replaced by a conventional electronic switching network. Switching networks of this type are well-known in the art and shall not be further descrbied herein.

In operation, a signal applied at input terminal 11 is sampled by A/D converter 10. The time-sampled digital signal from the output of converter 10 (in the form of a four-bit parallel digital line) is then applied to the input of scaling multiplier 14.

Main selector switch 24 is operated to select the number of samples to be integrated. Selector switch 24 is coupled to shifter switches 46 and divider 38 switches so that every change in setting of selector switch 24 produces a corresponding change in the coupled switches.

Scaling multiplier 14 modifies the signal from converter 10 so that the signal is multiplied by $2^{n_{max}-n}$, where $n$ is the binary exponent of the number of samples selected for integration. This binary multiplication is implemented by a well-known and simple line shifting technique accomplished by shifter switches 46. A switching of shifting over of one digital line occurs for each change in switch settings of selector switch 24. Thus a switching of main selector switch 24 from setting at $n_{max}$ to setting at n causes a binary multiplication of the input signal by $$\left(\frac{2^{n_{max}}}{2^n}\right),$$

in accordance with the present invention.

For example, to change the number of samples to be integrated from 8 ($n=3$) to 256 ($n=8$), the main selector switch is switched by five settings, thereby changing shifter switches 46 by five settings each. This switching causes a corresponding change in the connection of the A/D converter digital data lines 12 to the adder input lines 16. In the present example the A/D converter data lines 12 would each be shifted over five positions to the right. This shifting is equivalent of a binary multiplication of $2^{-5}$ times the input sample. In this manner scaling of the input sample is carried out so that the sample value will be adjusted to result in a "full" integrator output when integration of the selected number of full valued input samples is completed.

The scaled value of input signal 10 is then applied to the conventional feedback integrator 18. Feedback integrator 18 operates by multiplying a present sample value by a weighted value of prior integrator output, the product of this multiplication forming the new integrator output. The weighting factor, $k$, in effect determines the "memory" of the integrator, and therefore how many samples are to be integrated. In the embodiment of the present invention, integration is carried out by conventional feedback integrator 18 as follows. The prior value of integrator output, denoted as A, is stored in shift register 28. Divider 38 then forms the ratio $$\left(\frac{A}{2^n}\right)$$

(by shifting over $n$ position in accordance with the switch setting of main selector switch 24). Subtractor 40 then forms the quantity $$\left(A - \frac{A}{2^n}\right) \text{ or } A\left(1 - \frac{1}{2^n}\right).$$

Letting $k = 1 - \frac{1}{2^n}$, the prior value A of register 28 is seen to be multiplied by $k$. The value thus formed, $kA$, is then added to the new sample to form the new integrator output value. The result of the integration is then converted by D/A converter 22 for display by an analog device.

What is claimed and desired to be secured by letters patent of the United States is:

1. In a digital integrator device having input signal conditioning means and signal integrating means, the improvement comprising:

signal multiplying means for adjusting the magnitude of an input signal in accordance with the number of signals to be integrated, said multiplying means being connected between said conditioning means and said integrating means.

2. The digital integrator device of claim 1 wherein said multiplying means multiplies the input signal to said device by the factor $2^{n_{max}-n}$ wherein $2^n$ is the number of samples to be integrated and $2^{n_{max}}$ is the maximum number of samples to be integrated.

3. The digital integrator of claim 2 wherein said multiplying means is a binary multiplier.

4. The digital integrator of claim 3 wherein said binary multiplier is comprised of a switching network.

5. The digital integrator of claim 4 wherein said signal conditioning means is an analog-to-digital converter.

* * * * *